April 5, 1927.

D. R. LOVEJOY 1,623,628

COMBINED A BATTERY TRICKLE CHARGER AND B SUPPLY

Filed Oct. 16, 1926

WITNESS
Oliver W. Holmes

INVENTOR
DIMMITT ROSS LOVEJOY

BY
Knight Bro
ATTORNEYS

Patented Apr. 5, 1927.

1,623,628

UNITED STATES PATENT OFFICE.

DIMMITT ROSS LOVEJOY, OF NEW YORK, N. Y., ASSIGNOR TO LOVEJOY DEVELOPMENT CORPORATION, OF NEW YORK, N. Y., A CORPORATION OF NEW YORK.

COMBINED A BATTERY TRICKLE CHARGER AND B SUPPLY.

Application filed October 16, 1926. Serial No. 141,930.

This invention relates to the supply of power to audion circuits, and provides an improved method of operation and a new system of power supply.

An important object of the invention is to utilize power from house lighting circuits or other commercial voltage lines. In accomplishing this object, I employ a storage A-battery for heating the filaments and a trickle charger for maintaining the charge in the A-battery from the line. The commercial voltage of the line is cut down by a resistance in the positive lead, and if desired, by a further resistance in the negative lead, of the charging circuit, to a voltage approximating that of the battery voltage so that a small current flows continuously through the charging circuit and A-battery from the line. This small current in passing through the resistance element or elements provides graduated plus voltage from which plate current supply at suitable voltages may be tapped and when a resistance is employed in the minus lead of the charging circuit, this latter resistance provides a potential drop below the minus A-voltage for supplying a negative bias to the grid. Filter circuits are preferably employed to eliminate commutator noise or A. C. hum in all of the circuits. Two examples of the invention are illustrated diagrammatically in the accompanying drawing, in which—

Figure 1:
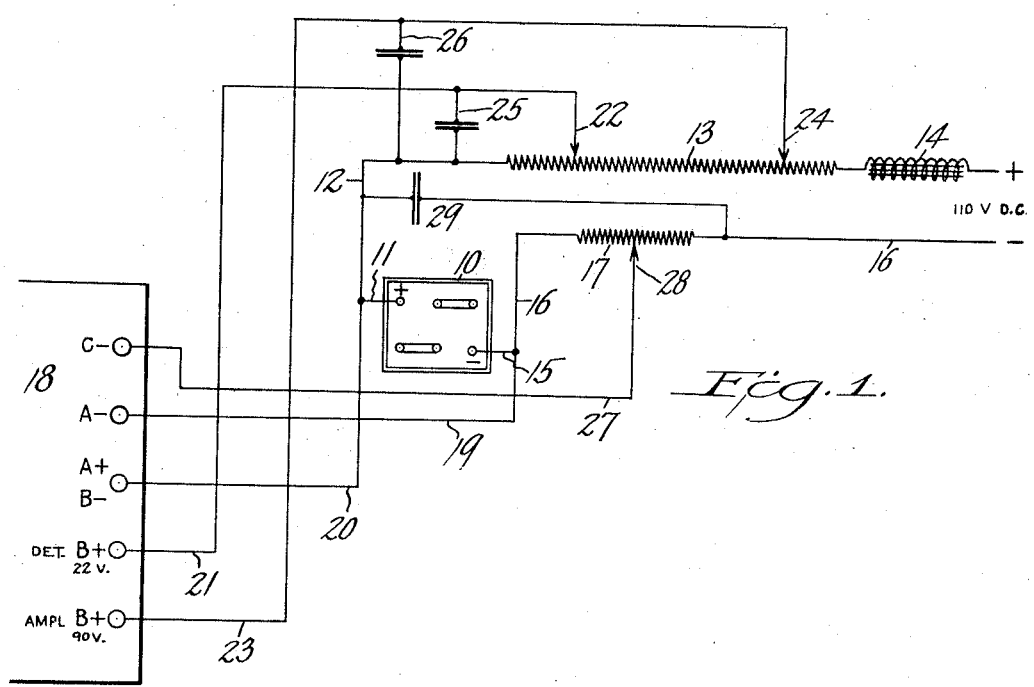
Figure 2:
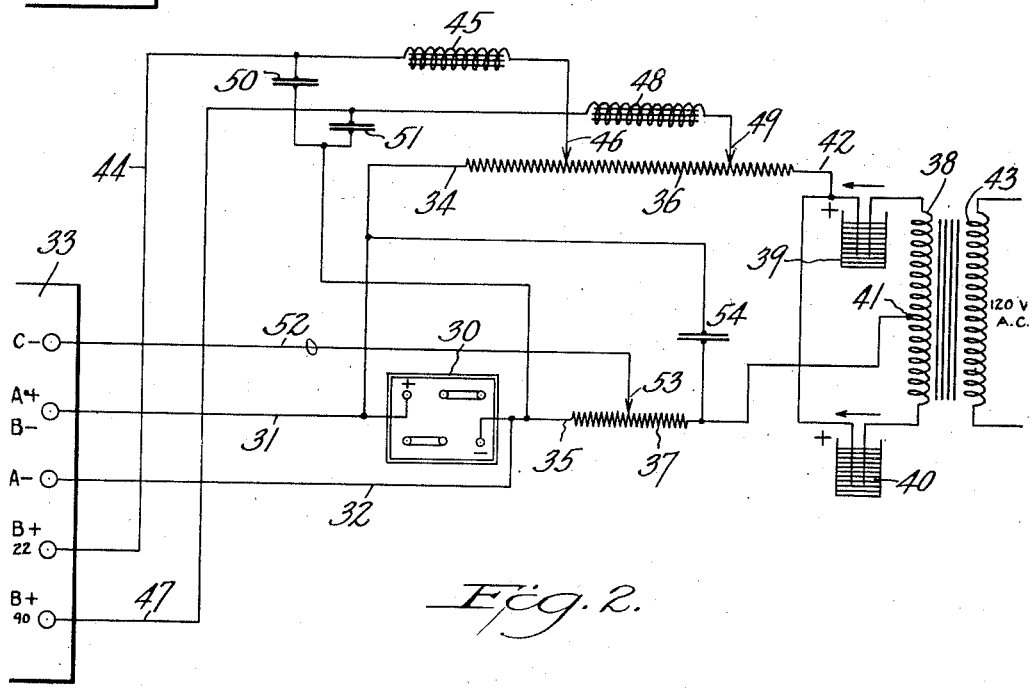

Figure 1 represents a system in which energy is taken from a direct current line of commercial voltage, and Figure 2 represents a system in which the energy is taken from an alternating current line of commercial voltage.

Referring to Figure 1, 10 represents the storage A-battery whose positive terminal 11 is connected through lead 12, resistance element 13, and choke coil 14, with the plus terminal of the commercial voltage line. The negative terminal 15 of the A-battery 10 is connected through lead 16 and resistance element 17, with the negative terminal of the line. The radio set is indicated at 18, with the usual binding posts for A, B, and C connections. The A-minus binding post is connected by lead 19 with the negative battery terminal 15, and the A-plus binding post is connected by lead 20 with positive terminal 11 of the A-battery. The detector B-plus binding post is connected by lead 21 to an adjustable tap 22 in contact with the resistance element 13 and the amplifier B-plus binding post is connected by lead 23 and adjustable tap 24 to another point of the resistance element 13. The example illustrated assumes a connection between B-minus and A-plus within the set so that the adjustable taps 22 and 24 have the function of deriving shunt currents for the plate circuit supply, across points of suitable voltage, which points are adjustable on the resistance element 13 to give different voltages. Condensers 25 and 26 are connected across from B-plus leads 21 and 23 respectively to the charging circuit lead 12 so as to constitute with choke coil 14 a filter system for minimizing disturbing irregularities in the current supply. When the resistance element 17 is employed in the negative lead of the charging circuit, the C-minus binding post may be adjustably connected thereto by the C-minus lead 27 and tap 28 so as to provide a negative grid bias. A filter condenser 29 may be inserted between positive charging lead 12 and a point beyond the negative end of resistance 17 to minimize fluctuation of grid bias.

In the example illustrated in Figure 2, the storage A-battery 30 is connected by plus and minus leads 31—32 with the A-plus and A-minus binding posts on the radio receiver 33. The battery terminals are connected with the positive lead 34 and negative lead 35 of a charging circuit which includes the resistance element 36 in the positive lead, the resistance element 37 in the negative lead, the secondary coil 38 and rectifiers 39—40 which are connected in parallel between neutral point 41 of the transformer secondary and the positive end 42 of the resistance element 36. The primary coil 43 is presumed to be connected with a standard voltage alternating current circuit. The detector B-plus binding post on the radio receiver is connected by plate lead 44, choke coil 45 and adjustable tap 46 with a suitable voltage point on the resistance element 36 and the amplifier B-plus binding post is similarly connected through a plate lead 47, choke coil 48, and adjustable tap 49 with another suitable voltage point on the resistance element 36. Filter condensers 50 and 51 are connected between the plate leads 44 and 47 respectively with the minus side of the charging circuit. In this example, as in the example previously described, it is assumed that the minus B of the plate circuit in the radio set is connected with the plus A so that shunt currents for plate supply are led off from points at suitable voltages on the resistance element 36. The C-minus binding post of the receiver 33 may be connected by the C-minus lead 52 and an adjustable tap 53 with a suitable point on the resistance element 37 to provide the desired negative grid bias. To steady this bias, a condenser 54 may be connected across the lead 34 and the negative side of the charging circuit as shown.

In operation, the trickle charge which is supplied to the A-battery, represents a much smaller current than would be required for continuous filament supply and it is, of course, understood that such a current value as contemplated in the charging circuit of the present invention requires substantial periods of charging with no consumption in the radio receiving set. With such a low current in the charging circuit, much smaller filter elements will suffice than would be required for similar purposes in the case of larger currents. They may, therefore, be relatively inexpensive. Furthermore, the small charging current enables a more gradual voltage drop to be obtained in the resistance element and consequently a more convenient separation of the adjustable taps for deriving the plate current supply. It is to be understood that any suitable filter circuits other than those herein shown by way of example, may be employed and that any well known type of rectifier may be used in the case of alternating current lines.

I claim:—

1. Apparatus for supplying power to audion circuits, comprising a storage A-battery for filament current supply, a trickle charger circuit for said storage A-battery, said charger circuit including a series resistance element for causing a voltage drop, and connections for applying between the filament and another electrode of the audion circuit a voltage difference established by said resistance element with respect to another point in the charger circuit.

2. A power supply for audion circuits comprising a storage A-battery for supplying filament current, a charging line including a series resistance element in the positive lead for charging said storage A-battery at a low current rate, and a plate current supply line shunting a portion of said charging line between two points of suitable voltage difference.

3. A power supply for audion circuits comprising a storage A-battery for supplying filament current, a charging line, including a series resistance element in the negative lead for charging said storage A-battery at a low current rate, and a grid bias connection from said charging line at a point made more negative than the minus A-battery terminal by voltage drop in said resistance element.

4. Apparatus for supplying power to audion circuits comprising a storage A-battery for filament current supply, a trickle charger circuit for said storage A-battery, said charger circuit including a series resistance element in the positive lead, and a series resistance element in the negative lead for causing voltage drops in the charger circuit, a plate circuit connection from a point in the charging line made more positive than the plus A-battery terminal by said series resistance element in the positive lead, and a grid circuit connection from a point in the charging circuit made more negative than the minus A-battery terminal by the resistance element in the negative lead of said charging circuit.

5. The method of supplying power to audion circuits which comprises delivering filament current from a storage A-battery while charging said storage A-battery at a low rate from a commercial voltage line through a resistance in the plus lead of sufficient value to drop the voltage at the storage A-battery terminals to approximately battery voltage, and delivering plate current from a shunt between an intermediate voltage point of the resistance in the plus lead and a more negative point of the charging circuit.

6. The method of supplying power to audion circuits which comprises delivering filament current from a storage A-battery while charging said storage A-battery at a low rate from a commercial voltage line through a series resistance element in the minus lead, and delivering a grid bias voltage from a point in the negative lead of the charging circuit rendered more negative than the negative terminal of said storage A-battery by voltage drop occurring in said resistance element.

DIMMITT ROSS LOVEJOY.